US010530975B2

(12) United States Patent
Kazemzadeh et al.

(10) Patent No.: US 10,530,975 B2
(45) Date of Patent: Jan. 7, 2020

(54) IMAGING SYSTEM AND METHOD FOR CONCURRENT MULTIVIEW MULTISPECTRAL POLARIMETRIC LIGHT-FIELD HIGH DYNAMIC RANGE IMAGING

(71) Applicants: Farnoud Kazemzadeh, Kitchener (CA); Alexander Sheung Lai Wong, Waterloo (CA); Shahid Abbas Haider, Waterloo (CA)

(72) Inventors: Farnoud Kazemzadeh, Kitchener (CA); Alexander Sheung Lai Wong, Waterloo (CA); Shahid Abbas Haider, Waterloo (CA)

(*) Notice: Subject to any disclaimer, the term of this patent is extended or adjusted under 35 U.S.C. 154(b) by 0 days.

(21) Appl. No.: 14/840,013

(22) Filed: Aug. 30, 2015

(65) Prior Publication Data
US 2016/0065938 A1    Mar. 3, 2016

Related U.S. Application Data

(60) Provisional application No. 62/043,712, filed on Aug. 29, 2014.

(51) Int. Cl.
| | |
|---|---|
| *H04N 5/225* | (2006.01) |
| *H04N 5/33* | (2006.01) |
| *H04N 5/235* | (2006.01) |
| *H04N 13/232* | (2018.01) |

(52) U.S. Cl.
CPC ......... *H04N 5/2254* (2013.01); *H04N 5/2258* (2013.01); *H04N 5/2355* (2013.01); *H04N 5/332* (2013.01); *H04N 13/232* (2018.05)

(58) Field of Classification Search
CPC ............ H04N 5/2254; H04N 13/0232; H04N 5/2258; H04N 5/332; H04N 5/2355
See application file for complete search history.

(56) References Cited

U.S. PATENT DOCUMENTS

| | | | |
|---|---|---|---|
| 2008/0013191 A1* | 1/2008 | Togino ................... | G02B 13/06 359/725 |
| 2010/0176992 A1* | 7/2010 | T'siobbel ................ | G01S 19/22 342/357.25 |

(Continued)

*Primary Examiner* — Mekonnen D Dagnew
(74) *Attorney, Agent, or Firm* — Tai W. Nahm; Miller Thomson LLP

(57) ABSTRACT

There is disclosed a novel system and method for multiview, multispectral, polarimetric, light-field, and high dynamic range imaging in a concurrent manner specifically capturing information at different spectral bands and light polarizations simultaneously. The present system and method is capable of (1) concurrent imaging of multiple spectral bands (including spectral bands beyond the visible region of the electromagnetic spectrum), proportional or greater than the number of filters used in the device, (2) concurrent imaging of multiple light polarizations (Stokes vectors), (3) acquiring images at different point-of-view of the same scene and/or object that allow for topographical reconstruction, (4) concurrent imaging of the multiple depth of fields that allow for light-field imaging, and (5) concurrent imaging of multiple simulated exposures of the detector that allow for high dynamic range imaging, all at the same time using a single sensor in the same imaging system enclosure.

10 Claims, 7 Drawing Sheets

(56) References Cited

U.S. PATENT DOCUMENTS

| | | | |
|---|---|---|---|
| 2012/0038810 A1* | 2/2012 | Taniguchi | H01L 27/14621 348/308 |
| 2012/0056994 A1* | 3/2012 | Fyffe | G06K 9/00255 348/47 |
| 2014/0161363 A1* | 6/2014 | Sargent | G06K 9/00355 382/224 |
| 2016/0069743 A1* | 3/2016 | McQuilkin | G01J 3/2803 356/416 |

* cited by examiner

IMAGING SYSTEM AND METHOD FOR CONCURRENT MULTIVIEW MULTISPECTRAL POLARIMETRIC LIGHT-FIELD HIGH DYNAMIC RANGE IMAGING

FIELD OF THE INVENTION

The present invention relates generally to the field of digital cameras, more particularly digital cameras that are capable of performing multiview, multispectral, polarimetric, light-field, and high dynamic range imaging.

BACKGROUND

Multispectral (MS) imaging is a technique for capturing images of a scene and/or object at different and specific spectral wavelength ranges. The human eye is capable of observing the visible wavelength ranges of the electromagnetic (EM) spectrum, which is a very small portion of the entire EM spectrum. If a broadband, "white" light source, such as the Sun, is illuminating an object, that object would remit light wavelengths in addition to the visible wavelengths.

Measuring the certain characteristics of the light remitted by an object can provide clues about the objects intrinsic properties. For example, these properties can include the physical state or the molecular composition of the object observed, along with many other derived properties. Polarimetric imaging is the method of capturing images of a scene and/or object at different and specific light polarizations. Light travels as a transverse electromagnetic wave and can vibrate in different directions orthogonal to its direction of travel. These directions of vibration, or polarizations of light, can change as it passes through different materials due to their scattering characteristics and molecular structure. Light polarization analysis is used for identifying degree of depolarization heterogeneity amongst supposedly homogeneous scenes, objects and/or materials. The use of multispectral and polarimetric imaging has become common practice in many fields such as science, defense, security, food inspection, quality control, criminology, remote sensing, and medicine. The number of applications for such imaging systems is continuously growing.

There are several methods enabling MS imaging. The simplest method is to dissociate a color image, captured using a polychromatic camera, into its red, green, and blue (RGB) channels [1]. This method sub-divides the visible spectrum into three independent spectral bands. The spectral bands are highly dependent on the spectral response of the polychromatic detector used for imaging and will vary between different detectors by different manufacturers. This method is not a very accurate radiometric representation of field-of-view (FOV) because polychromatic detectors typically use a Bayer filter [2] to acquire the three channel RGB information and interpolate the missing spectral information in a given detector pixel using its neighboring pixels which do not contain similar spectral information.

There exist two alternate, and perhaps more accurate, methods for MS imaging. The first method employs a series of spectral bandpass filters combined with a monochromatic camera. These filters are designed to accurately transmit a wavelength range of interest while suppressing all other wavelengths. The filters can be placed in the path of the light entering the camera using a motorized filter wheel [3], or liquid-crystal tunable filters [4], or acousto-optical tunable filters [5]. The second method uses a series of light sources that can illuminate the target with light of a specific wavelength range. In this case the remitted light is acquired on a monochromatic camera [6, 7]. Both of these alternate methods require sequential imaging of the FOV which can be time consuming and non-preferential when imaging dynamic FOVs.

Simultaneous imaging is possible using various beamsplitter arrangements while imaging each spectral region on its own respective camera system [8]. A handheld MS imager for terrestrial applications available on the market is ADC by TETRACAM Inc. [9]. This device is capable of imaging three spectral bands spanning the visible to the near-Infrared (NIR) spectral range. There are reports of other hand-held multispectral imaging devices [10, 11, 12], but these systems only operate either in the visible or in the NIR spectral range and are not capable of stereoscopic imaging. Manakov developed a handheld MS imager using an augmentation to digital single lens reflex (DSLR) cameras, although this goal is yet to be attained [13]. Their instrument creates an image of the FOV on a diffuser, placed at the entrance pupil of a kaleidoscope, and based on the working principles of a kaleidoscope reproduces the image of the FOV of the camera many times and uses a spectral bandpass filter array to filter each reproduced image before image acquisition by the camera. Their device acquires multiple spectra for a single viewpoint which provides the benefit of not needing to register the array of images post-acquisition, however it does not maintain the radiometric fidelity of the data. This instrument is therefore limited in performance since it only operates in the visible region of the EM spectrum, is not capable of stereoscopic imaging, and optical aberrations are present in the images which degrade the quality.

Camera approaches for measuring polarization states have to rely upon filters to isolate the direction of vibration in the EM wave. Methods of filtration to measure multiple states include using rotating polarizing filter wheel [14], polarizing prisms [15], and polarizing gratings [16]. Rotating polarizing arrays and polarizing prisms take sequential images, one polarization state at a time, to perform their measurement. In dynamic applications, time differences in the acquisition can require later image registration and signal calibration. These methods can be extended to having multiple detectors dedicated to each polarization state, using various beam splitting mechanisms, to make the image acquisition simultaneous; however, this requires the introduction of additional optics to redirect and split the light, resulting in a more complicated system and potential efficiency issues as well as introducing aberrations in the images. Polarizing gratings have been shown to do simultaneous channelled image polarimetry [16], being able to measuring the Stokes vector of a scene using the interferometric pattern of various polarization states simultaneously. This method uses prior knowledge about the scene's inherent polarization to perform the extraction, thereby requiring pre- and post-calibration of the measuring device in order to extract the desired properties of the measured light.

Light-field imaging is the method of capturing information pertaining to a scene and/or image, where the light intensity going through each point in space at different directions is captured. Light-field imaging has previously been accomplished using multiple cameras positioned at different locations, directions, and focuses, with each camera capturing different light information that is then used to characterize the light-field together. This multi-camera setup is complex, and is difficult to calibrate. Some single-camera light-field imaging systems have been introduced that make use of a microlens array placed behind the main lens of the camera system, directly in front of the detector [17]. In the light-field imaging system proposed by Georgiev [18], an array of lens and/or prisms are placed between the object and/or scene and the main lens of the camera system. It is important to note, however, that none of these light-field imaging systems can capture images at multiple spectral bands that include bands beyond the visible band and at multiple light polarizations, concurrently.

High dynamic range (HDR) imaging is used to overcome the dynamic range limitations of cameras [19]. Modern cameras automatically adjust or allow for adjustment of the exposure time for a specific scene; however, there may exist portions of an image that can be over- or under-exposed as a result. In HDR imaging, this issue is circumvented by sequentially capturing multiple images at varying exposure times [19], using neutral-density (ND) filters to artificially reduce the amount of light that enters the camera while sequentially changing the filter strength [20], or using a series of beam-splitters and camera trees all with different exposure settings [8, 21]. This mode of imaging suffers from similar shortcoming previously mentioned with regards to MS and polarimetric imaging systems.

Each of the above described image capture methods and systems have drawbacks and limitations, as described. Therefore, what is needed are improvements to MS image capture which addresses at least some of these limitations.

SUMMARY

The present invention relates generally to a system and method for capturing multiview images at different spectral bands and light polarizations. all at the same time utilizing improved imaging technologies and image processing techniques to perform concurrent multiview, multispectral, polarimetric, light-field, and HDR imaging. Currently, to the best of the inventors' knowledge, there are no existing systems and methods that are capable of performing multiview, multispectral, polarimetric, light-field, and high dynamic range imaging in a concurrent manner in spectral bands beyond the visible EM spectrum.

Thus, in an aspect, a new form of imaging is introduced and referred to in this disclosure as "concurrent multiview, spectral-polarimetric, light-field, high dynamic range imaging" or CMSLHI. In an embodiment, CMSLHI is capable of (1) concurrent imaging of multiple spectral bands (including spectral bands beyond the visible region of the EM spectrum), proportional or greater than the number of filters used in the device. (2) concurrent imaging of multiple light polarizations (Stokes vectors), (3) concurrent acquisition of images at different POVs of the same scene and/or object that allow for three-dimensional imaging and topographical reconstruction, (4) concurrent imaging of the multiple depth of fields that allow for light-field imaging, and (5) concurrent imaging of multiple simulated exposures of the detector that allow for HDR imaging, all at the same time using a single detector in the same imaging system enclosure (in other embodiments, multiple detectors can be used within the same imaging enclosure).

In an embodiment, the system comprises a series of on-axis and off-axis mirrors acting in concert to produce a set of points-of-views (POVs) of a target scene and/or object. Each of the POVs is guided through a series of spectral bandpass filters (corresponding to different spectral wavelengths) and/or polarization filters (corresponding to different linear and circular polarizations) and/or Neutral Density ("ND") filters (corresponding to different throughput efficiencies) onto a different location on a detector within the same imaging enclosure. The measurements on the detector from the different POV projections are then used to represent the MS, polarimetric, and HDR information of the scene as well as the three-dimensional topographical surface of the scene.

In another embodiment, the system comprises a series of on-axis off-axis mirrors acting in concert to produce a set of POVs of a target scene and/or object. Each of the POVs is guided through a lens, with a different numerical aperture (NA), and then guided through a series of spectral bandpass filters (corresponding to different spectral wavelengths) and/or polarization filters (corresponding to different linear and circular polarizations) and/or ND filters (corresponding to different throughput efficiencies) onto a different location on the detector within the same imaging enclosure. The measurements on the detector from the different points-of-views projections are then used to represent the MS, polarimetric, light-field, and HDR information of the scene as well as the three-dimensional topographical information of the surface in the scene.

In yet another embodiment, the system comprises a series of on-axis and off-axis lenses (with similar NA) arranged on a parabolic dish to produce a series of images of a target scene and/or object, each projecting through a series of spectral bandpass filters (corresponding to different spectral wavelengths) and/or polarization filters (corresponding to different linear and circular polarizations) and/or ND filters (corresponding to different throughput efficiencies) onto a different location on a detector within the same imaging enclosure. The measurements on the detector from the different POVs projections are then used to represent the MS, polarimetric, light-field, and HDR information of the scene as well as the three-dimensional topographical information of the surface of the scene.

In this respect, before explaining at least one embodiment of the invention in detail, it is to be understood that the invention is not limited in its application to the details of construction and to the arrangements of the components set forth in the following description or the examples provided therein, or illustrated in the drawings. Therefore, it will be appreciated that a number of variants and modifications can be made without departing from the scope of the invention as described herein. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The present invention will be better understood and objects of the invention will become apparent when consideration is given to the following detailed description thereof. Such description makes reference to the annexed drawings, wherein.

Figure 1:
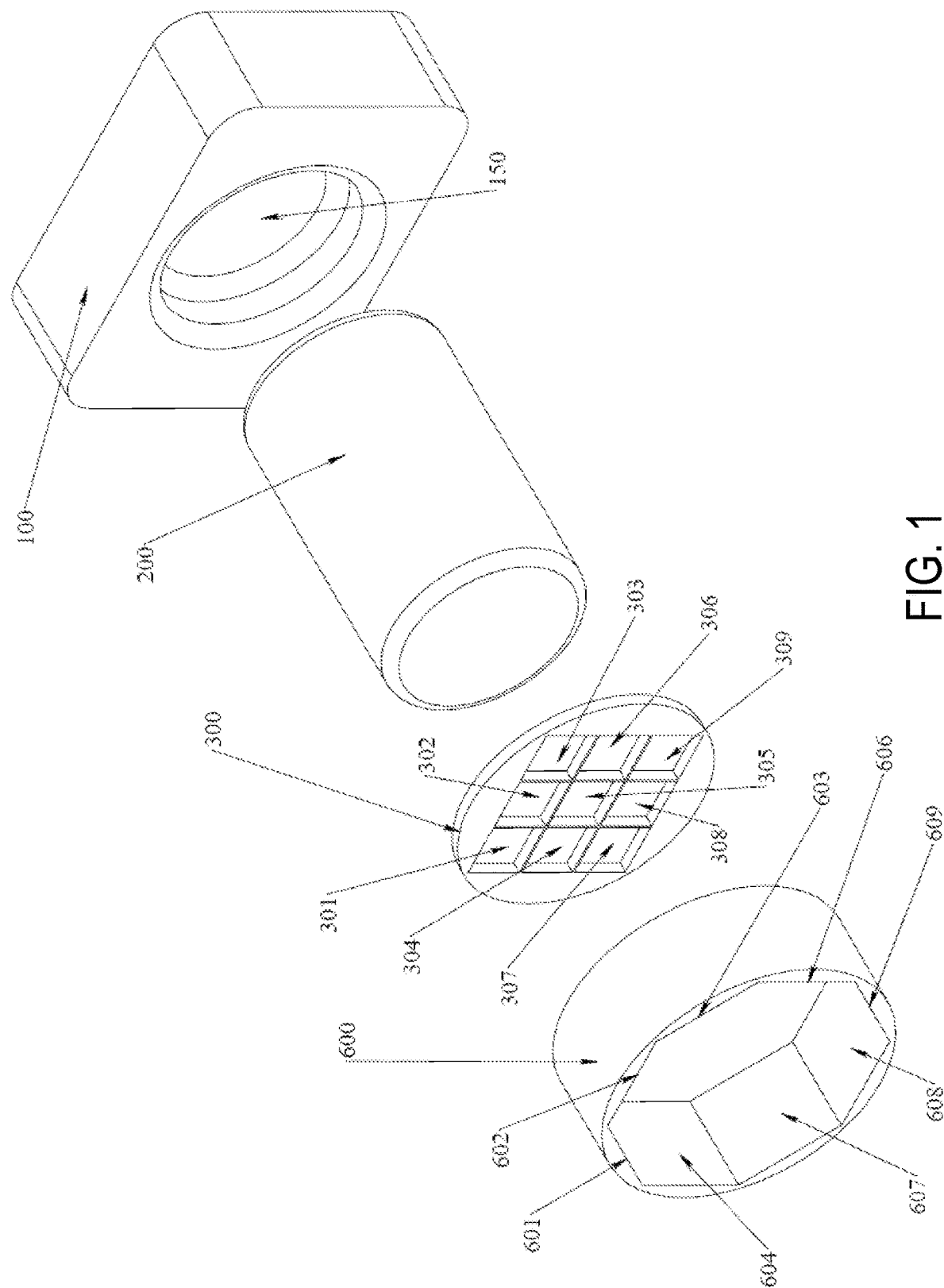
FIG. 1 shows an illustrative system and method for performing concurrent multiview, MS, polarimetric, and HDR imaging configuration in accordance with an embodiment.

In the drawings, embodiments of the invention are illustrated by way of example. It is to be expressly understood that the description and drawings are only for the purpose of illustration and as an aid to understanding, and are not intended as describing the accurate performance and behavior of the embodiments and a definition of the limits of the invention.

DETAILED DESCRIPTION

As noted above, the present disclosure relates to an improved system and method for capturing multispectral (MS) images. In an embodiment, the system and method simultaneously captures multiview images at multiple discrete spectral bands, in the visible and NIR, and light polarizations concurrently utilizing improved imaging technologies and image processing techniques. A term is used herein which refers to Concurrent Multiview, Spectral-polarimetric, Light-field, HDR Imaging (CMSLHI).

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the embodiments described herein.

However, it will be understood that the embodiments described herein may be practiced without these specific details. In other instances, well-known methods, procedures and components have not been described in detail, so as not to obscure the embodiments described herein. Furthermore, this description is not to be considered as limiting the scope of the embodiments described herein in any way, but rather as merely describing the implementation of the various embodiments described herein. Finally, while all of the embodiments described herein are described to provide nine views that are concurrently imaged for illustration purposes, the invention is not limited to providing nine views and other embodiments of this invention may provide less than nine views or more than nine views that are concurrently imaged.

With reference to FIGS. 1, 1A, 2, 2A, 3, and 3A, a detector 100 and an imaging lens system 200 are shared between all embodiments presented, and can be combined to perform as a "camera". A person skilled in the art will understand that any detector 100-lens 200 combination may be used as the image capturing (camera) portion of the system and method without limiting the scope of the embodiments described herein.

With reference to FIG. 1, a concurrent multiview, MS, polarimetric, HDR imaging embodiment of the present system and method is illustrated. The field multiplying element 600 houses a plurality of reflective surfaces, i.e. mirrors, 601, 602, 603, 604, 606, 607, 608, 609.

In this illustrative embodiment, there exists no mirror for the "zenith" view which passes straight through element 600 without reflecting off any mirror. Each of the mirrors 601-609 are adapted to present light entering from the FOV from an independent, mutually exclusive perspective of the FOV.

In this illustrative embodiment, a total of nine perspective views then encounter a filter housing element 300 which in this illustrative example includes nine independent permutations of spectral bandpass filters and/or polarizing filters and/or ND filters 301 through 309. Following the filtering phase, the nine perspective views are then concurrently imaged by the camera.

It will be appreciated that the reflecting surfaces, 601-609, need not to be a planar mirror and instead can be any planar reflective surfaces or non-planar (focusing) reflective surfaces negating the need for the imaging lens system 200.

Figure 1A:
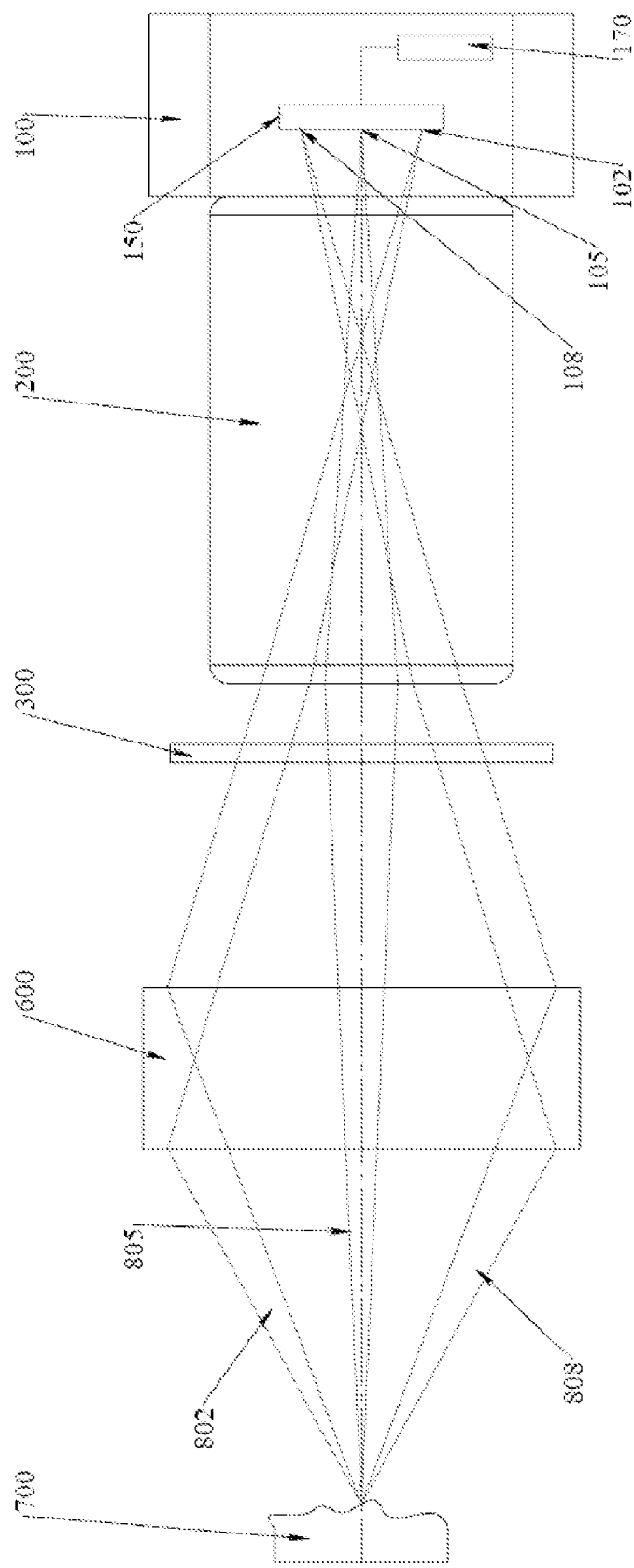
FIG. 1A shows an illustrative system and method for performing concurrent multiview, MS, polarimetric, and HDR imaging while illustrating a select few light beam paths through the optical elements in accordance with another embodiment.

Referring to FIG. 1A, concurrent multiview, MS, polarimetric, and HDR embodiments of the system and are shown, while illustrating a select few light beam paths through the optical elements by way of example.

In this illustration, a subject 700 scatters light that is shown onto it in all directions. It will be appreciated that an illumination source with prescribed spectral and polarization characteristics, external or internal to the embodiment, can be used to illuminate the subject 700 in preparation for imaging, Additionally, the subject 700 can be imaged in an ambient lighting condition.

A number of beams 802, 805, and 808 of light are a selection of three of many beams of light that can be observed scattered by the subject 700. These beams 802, 805, and 808 are also a selection of three of the nine beams that are observed by the system and method. The beams 802 and 808 are each reflected and redirected off of their corresponding mirrors, 602 and 608 housed in the field multiplying element 600. The beam 805 is the "zenith" view, and hence does not encounter a mirror in the field multiplying element 600. Each of the beams 802, 805, and 808 then encounters a permutation of spectral bandpass filters and/or polarization filters and/or ND filters in the filter housing element 300, as illustrated in FIG. 1, and are accordingly filtered. The beams then continue to the camera (100, 200) and the filtered images of subject 700 from each of the beams 802, 805, and 808 are then focussed at different positions 102, 105, and 108 on a sensor 150 located in the detector 100. The sensor 150 may be any type of sensor technology (e.g. charge-coupled devices CCD, complementary metal-oxide-semiconductor CMOS, Indium Gallium Arsenide InGaAs) suitable for capturing the filtered images of subject 700 as a composite image file is then stored on a non-volatile memory, such as a flash memory card 170. The camera may alternatively be tethered by cable or linked wirelessly to a computer, as represented for example by a generic computing device 1000 described further below with reference to FIG. 4, such that the composite image file can be stored directly into storage of the computing device 1000.

Figure 2:
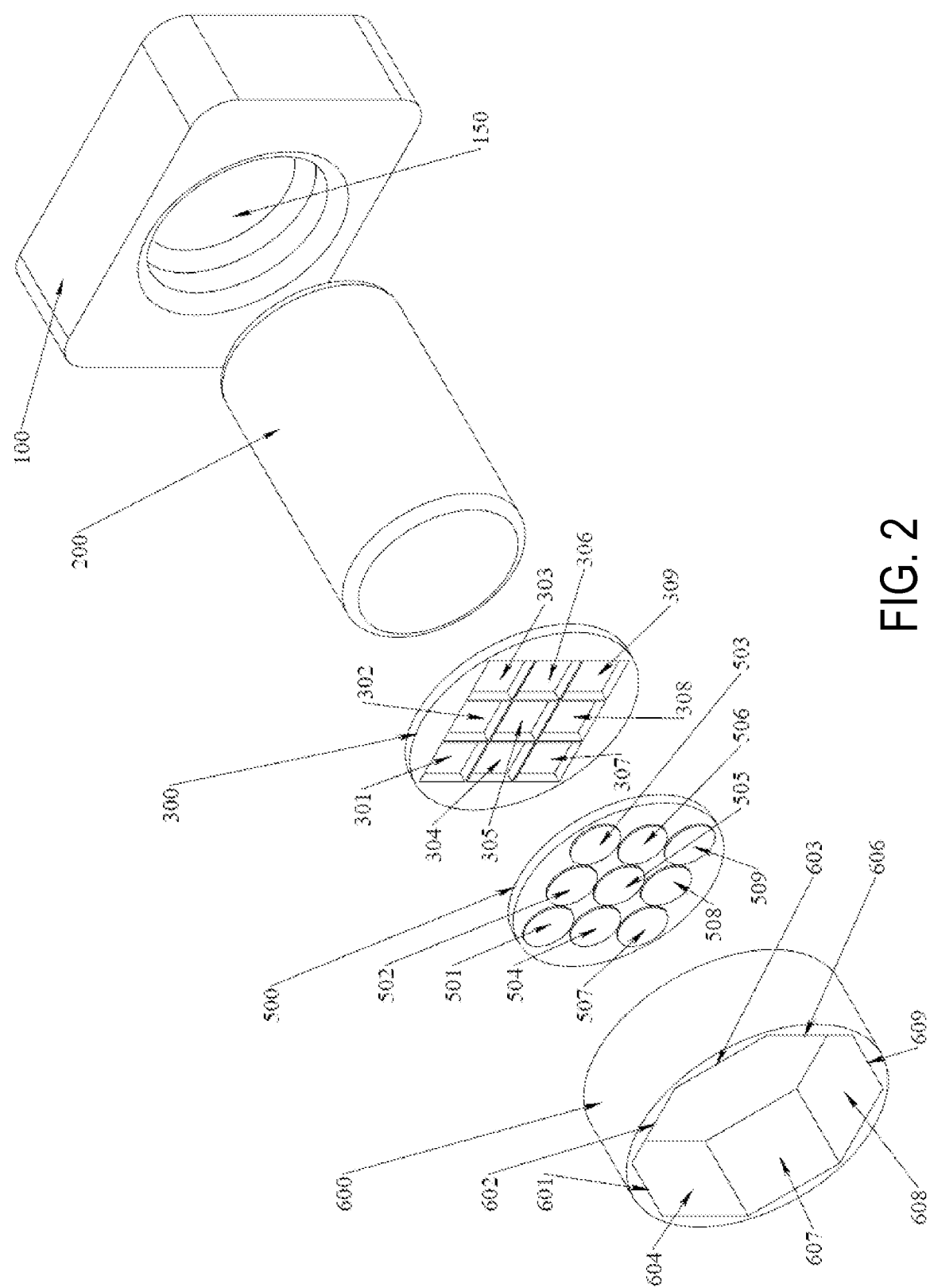
FIG. 2 shows an illustrative system and method for performing concurrent multiview, MS, polarimetric, light-field, and HDR imaging configuration in accordance with another embodiment.

Now referring to FIG. 2, another embodiment of the present system and method is illustrated. In this embodiment, the field multiplying element 600 houses a plurality of planar reflective surfaces, such as mirrors 601, 602, 603,

604, 606, 607, 608, 609. There exists no mirror for the zenith view passing straight through element 600. Each of the mirrors presents the light of the FOV from an independent mutually exclusive perspective of the FOV. Each of the nine perspective views encounter their respective field lens, 501 through 509, contained in the lens housing element 500.

The lenses in this element can have the same or different NA, and therefore focal length. The total of nine perspective views then encounter the filter housing element 300 which comprise of nine independent permutations of spectral bandpass filters and/or polarizing filters and/or ND filters 301 through 309. Following the filtering phase, the nine perspective views are then concurrently imaged by the camera. As will be appreciated, the reflecting surfaces need not be planar mirror, and can be any planar reflective surfaces or non-planar (focusing) reflective surfaces, negating the need for the lens housing element 500 or the imaging lens system 200.

Figure 2A:
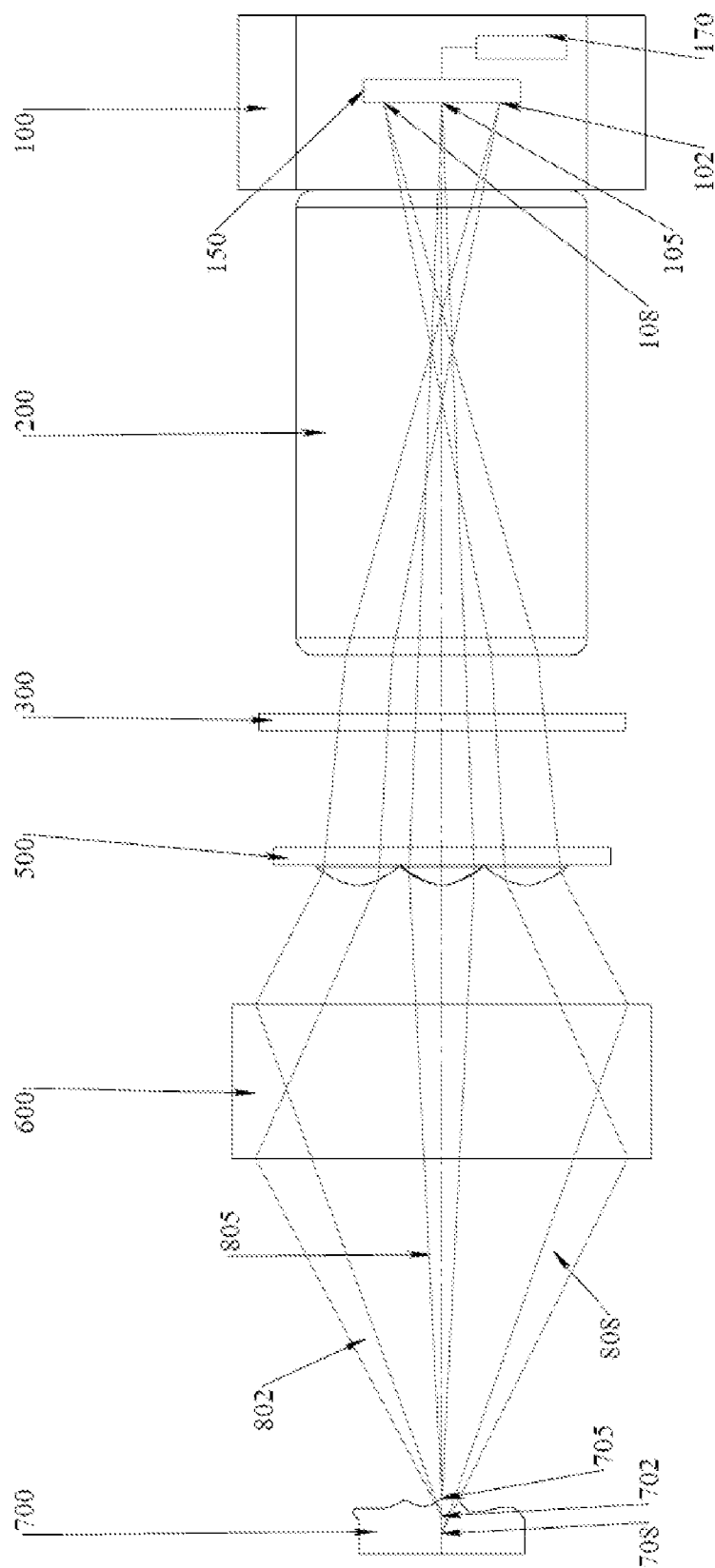
FIG. 2A shows an illustrative system and method for performing concurrent multiview, MS, polarimetric, light-field, and HDR imaging while illustrating a select few light beam paths through the optical elements in accordance with another embodiment.

Referring to FIG. 2A, a concurrent multiview, MS, polarimetric, light-field, and HDR imaging embodiment of the system and method is illustrated while illustrating a select few light beam paths through the optical elements of the system and method. The subject 700 scatters light that is reflected off of it in all directions.

The beams 802, 805, and 808 are a selection of three of many beams of light that can be observed scattered by the subject 700. They are also a selection of three of the nine beams that are observed by the system and method.

The beams 802 and 808 are each reflected and redirected off of their corresponding mirrors, 602 and 608 housed in the field multiplying element 600. The beam 805 is the zenith view hence does not encounter a mirror in the field multiplying element 600.

Each of the beams 802, 805, and 808 will then encounter their respective field lens 502, 505, and 508 in the lens housing element 500. Depending on the NA of the field lens, only the light scattered from a specific depth, 705, 702, and 708 in this case, in the FOV will be collimated toward the filter housing element 300.

Each one of the beams will then encounter their respective permutations of spectral bandpass filters and/or polarization filters and/or ND filters in the filter housing element 300, then are accordingly filtered. The beams then continue to the camera and their images are formed at positions 102, 105, and 108 on sensor 150 located in the detector 100. The images are then stored in a memory card 170 or transferred to a tethered computing device for storage.

It will be apparent that the notion of imaging within the depth of the subject 700 is only possible with the correct combination of the field lenses 501 through 509 and spectral filters and polarizations filters 301 through 309. Thus, it will be appreciated that an illumination source with prescribed spectral and polarization characteristics, external or internal to the embodiment, can be used to illuminate the subject 700 in preparation for imaging, Additionally, the subject 700 can be imaged in ambient lighting condition and the imaging lens system 200 can alternatively be removed from the embodiment without affecting the function of the embodiment.

Figure 3:
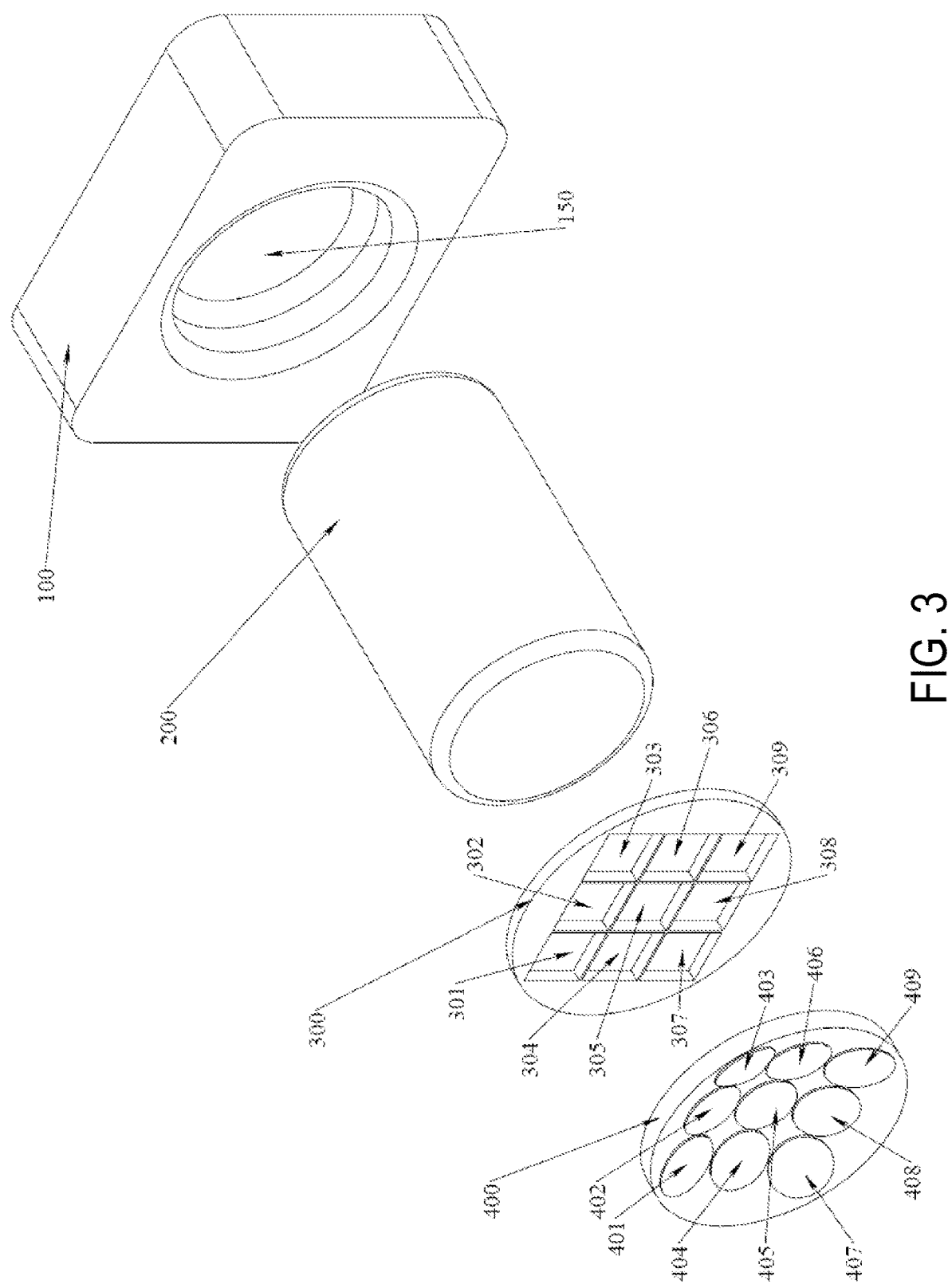
FIG. 3 shows an illustrative method of performing concurrent multiview, MS, polarimetric, light-field, and HDR imaging configuration in accordance with another embodiment.

With reference to FIG. 3, another embodiment of the system and method is illustrated. In this embodiment, a parabolic field lens housing element 400 is used to contain nine lenses, 401 through 409, of similar or different NA, and therefore focal length. The parabolic nature of element 400 is to enable all nine lenses, contained within, to observe the same FOV all from independent mutually exclusive perspectives. Each of the nine perspective views then encounter the filter housing element 300 which comprise nine independent permutations of spectral bandpass filters and/or polarizing filters and/or ND filters 301 through 309. Following the filtering phase the nine perspective views are then concurrently imaged by the camera.

Figure 3A:
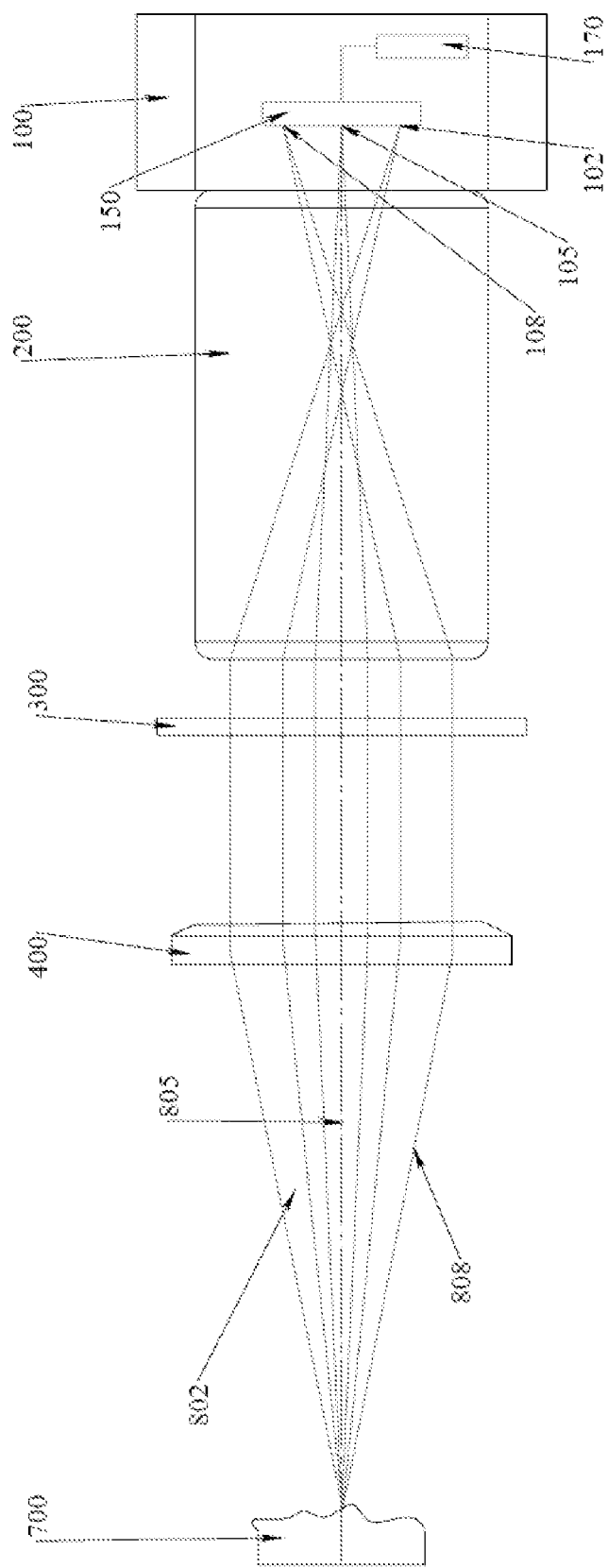
FIG. 3A shows an illustrative method of performing concurrent multiview, MS, polarimetric, light-field, and HDR imaging while illustrating a select few light beam paths through the optical elements in accordance with another embodiment.

Referring to FIG. 3A, the concurrent multiview, MS, polarimetric, light-field, and HDR imaging embodiment of the system and method is illustrated while illustrating a select few light beam paths through the optical elements of the system and method.

The subject 700 scatters light that is shown onto it in all directions. The beams 802, 805, and 808 are a selection of three of many beams of light that can be observed scattered by the subject 700. They are also a selection of three of the nine beams that are observed by the system and method.

The beams 802, 805, and 808 each encounter their corresponding lens, 402, 405, and 408, housed in the parabolic field lens housing element 400. The beams emerging from the field lenses then encounter their respective permutations of spectral bandpass filters and/or polarization filters and/or ND filters, 302, 305, and 308 contained in the filter housing element 300.

The filtered beams then continue to the camera and their images are formed at positions 102, 105, and 108 on a sensor 150 in the detector 100, and stored as previously described. It will be appreciated that by using similar spectral bandpass filters or polarizing filters or ND filters in 300s, while using lenses of differing NAs 400s this embodiment can be used for light-field imaging. If the lenses where to have the similar NA, with correct combination of ND filters, HDR imaging would be enabled in this embodiment.

It will be apparent that the notion of imaging within the depth of the subject 700 is only possible with the correct combination of the field lenses 401 through 409 and spectral filters and/or polarizations filters 301 through 309.

It will also be appreciated that and illumination source with prescribed spectral and polarization characteristics, external or internal to the embodiment, can be used to illuminate the subject 700 for imaging, additionally, the subject 700 can be imaged in ambient lighting condition. Moreover, the imaging lens system 200 can alternatively be removed from the embodiment without affecting the function of the embodiment.

In all embodiments the captured image is stored in the storage device 170 or in storage of a tethered computing device may be retrieved, processed and displayed, thereby making the captured image available for interpretation. A single image per acquisition is stored which contain information about all POVs as well as all spectral bands and polarization states. As a specific POV is recorded to a specific area of the sensor 150, it will be appreciated that parts of the captured image may be predefined and identified as having a particular POV with particular type of multi-spectral and polarimetric filtering applied.

The image that has been stored can be later retrieved from the storage device and may be processed to obtain the MS and polarimetric properties of the subject 700. The image that has been stored can be later retrieved from the storage device and may be processed to produce a multispectral or a hyperspectral image cube where the number of spectral channels is proportional or greater than the number of filters used in the device. As an example, additional channels in the spectral image cube can be produced by the present invention using numerical spectral disassociation methods such as those based on Wiener estimation and regression modeling, although other methods can be used in other embodiments. The image that has been stored can also be later retrieved from the storage device and may be processed to produce a 3D image/topographical map of the subject 700. The image may also be processed to produce a depth image and light-field information of the subject 700 or the FOV, and may also be processed to obtain HDR information corresponding to the subject 700 or the FOV.

Figure 4:
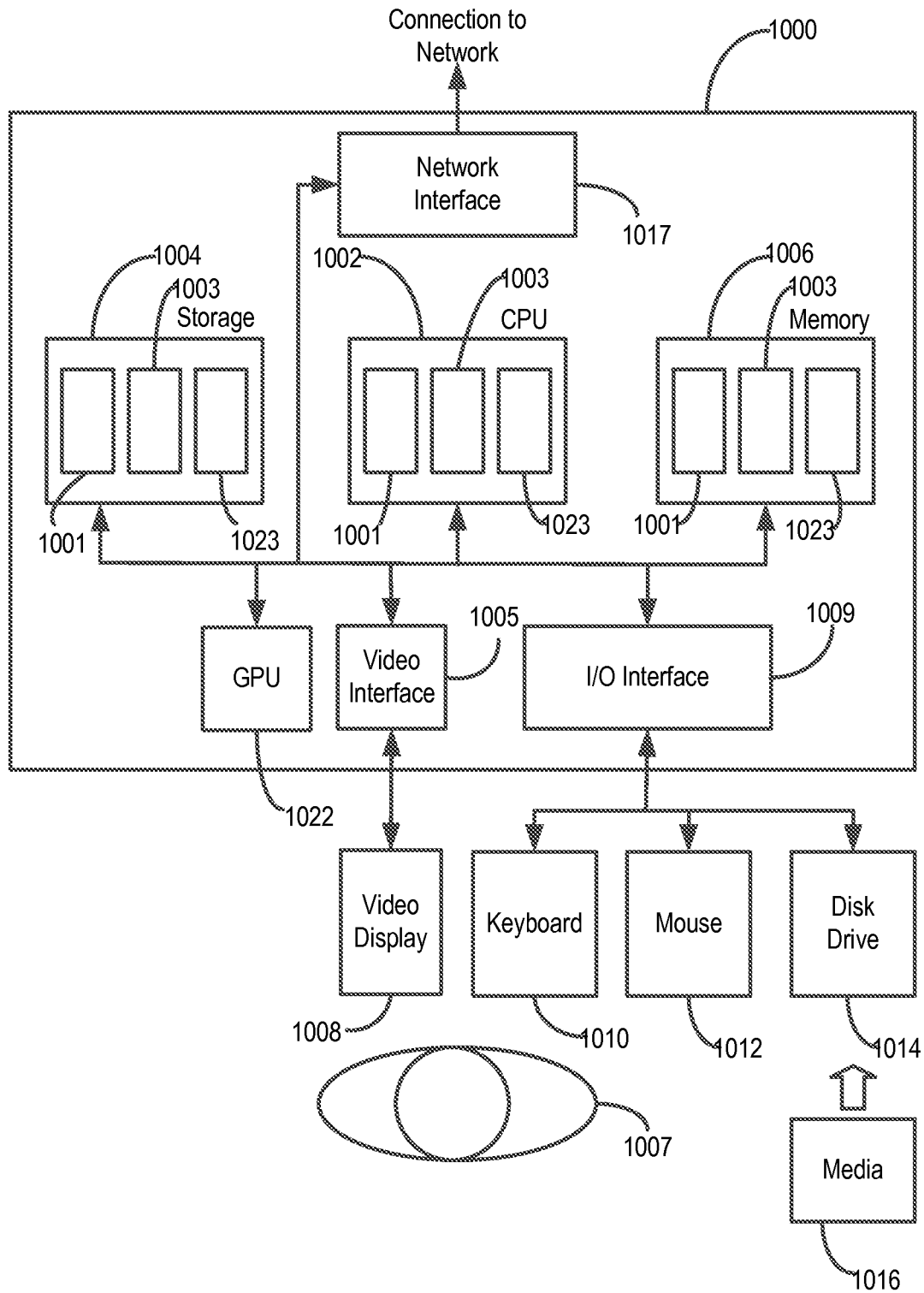
FIG. 4 shows a schematic block diagram of a generic computing device which may provide an operating environment for implementing the system or for performing a method.

Now referring to FIG. 4, shown is a schematic block diagram of a generic computing device. A suitably configured computer device, and associated communications networks, devices, software and firmware may provide a platform for enabling one or more embodiments as described above. By way of example, FIG. 4 shows a generic computer device 1000 that may include a central processing unit ("CPU") 1002 connected to a storage unit 1004 and to a random access memory 1006. The CPU 1002 may process an operating system 1001, application program 1003, and data 1023. The operating system 1001, application program 1003, and data 1023 may be stored in storage unit 1004 and loaded into memory 1006, as may be required. Computer device 1000 may further include a graphics processing unit (GPU) 1022 which is operatively connected to CPU 1002 and to memory 1006 to offload intensive image processing calculations from CPU 1002 and run these calculations in parallel with CPU 1002. An operator 1010 may interact with the computer device 1000 using a video display 1008 connected by a video interface 1005, and various input/output devices such as a keyboard 1010, pointer 1012, and storage 1014 connected by an I/O interface 1009. In known manner, the pointer 1012 may be configured to control movement of a cursor or pointer icon in the video display 1008, and to operate various graphical user interface (GUI) controls appearing in the video display 1008. The computer device 1200 may form part of a network via a network interface 1017, allowing the computer device 1200 to communicate with other suitably configured data processing systems or circuits. One or more different types of sensors 1030 connected via a sensor interface 1032 may be used to search for and sense input from various sources. The sensors 1030 may be built directly into the generic computer device 1000, or optionally configured as an attachment or accessory to the generic computer device 1000.

Thus, in an aspect, there is provided a system for capturing a multiview, multispectral image of a subject, comprising: a field multiplying element housing a plurality of reflective surfaces for obtaining multiple point-of-view (POV) images of a subject, and directing each POV image along one of a plurality of different beam paths; and a filter housing element adapted to receive a plurality of independent filters, each filter adapted to receive one POV image along one of the plurality of different beam paths; wherein the multiple POV images are directed to different areas of a sensor for capturing the multiple POV images simultaneously in an image file.

In an embodiment, the field multiplying element is adapted to provide a zenith view of the subject through its center, and a plurality of reflected views of the subject via the plurality of reflective surfaces arranged in a ring around the center of the field multiplying element.

In another embodiment, the plurality of reflective surfaces are substantially equal in size and arranged circularly around an inner surface of the ring around the center of the field multiplying element.

In another embodiment, the plurality of reflective surfaces are substantially flat.

In another embodiment, the filter housing element is adapted to receive the plurality of independent filters in an array, each filter of the array adapted to receive one POV image along one of the plurality of different beam paths.

In another embodiment, the filter housing element includes one or more polarizing filters for concurrent imaging of multiple light polarizations.

In another embodiment, the filter housing element includes one or more spectral bandpass filters and/or neutral density filters for concurrent imaging of a high dynamic range of light intensities.

In another embodiment, the system further comprises a lens housing element adapted to receive a plurality of field lenses, each field lens adapted to align with one of the plurality of different beam paths of the field multiplying element and one of the plurality of independent filters in the filter housing element.

In another embodiment, the plurality of field lenses in the lens housing element are adapted to perform light-field imaging for capturing information pertaining to light intensity going through each point in space at different directions.

In another embodiment, the plurality of field lenses in the lens housing element are adapted to be directed and focussed independently, thereby allowing all multiview, multispectral images of the subject to be captured simultaneously.

In another aspect, there is provided a system for capturing a multiview, multispectral image of a subject, comprising: a lens housing element including a plurality of lenses for obtaining multiple points-of-view (POV) images of a subject, and directing each POV image along one of a plurality of different beam paths; and a filter housing element adapted to include a plurality of independent filters, each filter adapted to receive one POV image along one of the plurality of different beam paths; wherein the multiple POV images are directed to different areas of a sensor for capturing the multiple POV images simultaneously in an image file.

In an embodiment, the plurality of lenses in the lens housing element are arranged in a parabolic dish configuration to produce a series of images of the subject.

In another embodiment, the filter housing element is adapted to receive the plurality of independent filters in an array, each filter of the array adapted to receive one POV image along one of the plurality of different beam paths.

In another embodiment, the filter housing element includes one or more polarizing filters for concurrent imaging of multiple light polarizations.

In another embodiment, the filter housing element includes one or more spectral bandpass filters and/or neutral density filters for concurrent imaging of a high dynamic range of light intensities.

In another embodiment, the plurality of field lenses in the lens housing element are each adapted to align with one of the plurality of different beam paths of the field multiplying element and one of the plurality of independent filters in the filter housing element.

In another embodiment, the plurality of field lenses in the lens housing element are adapted to perform light-field imaging for capturing information pertaining to light intensity going through each point in space at different directions.

In another embodiment, the plurality of field lenses in the lens housing element are each adapted to be directed and focussed independently, thereby allowing all multiview, multispectral images of the subject to be captured simultaneously.

While illustrative embodiments have been described above by way of example, it will be appreciated that various changes and modifications may be made without departing from the scope of the system and method, which is defined by the following claims.

REFERENCES

[1] D. Nakao, N. Tsumura, and Y. Miyake, "Realtime multispectral image processing for mapping pigmentation in human skin," in In Proceedings Ninth IS&T/SID Color Imaging Conference, IS&T, 1995, pp. 80-84.

[2] B. Bayer, "Color imaging array," American Patent 555 477, 1976.

[3] M. Yamaguchi, M. Mitsui, Y. Murakami, H. Fukuda, N. Ohyama, and Y. Kubota, "Multispectral color imaging for dermatology: Application in inflammatory and immunologic diseases," in Imaging Science and Technology, ser. 13th Color Imaging Conference, 2005.

[4] N. Gupta, "Acousto-optic-tunable-filter-based spectropolarimetric imagers for medical diagnostic applications: instrument design point of view," J. Biomed. Opt., vol. 10, no. 5, p. 051802, 2005.

[5] S. Harris and R. Wallace, "Acousto-optic tunable filter," J. Opt. Soc. Am., vol. 59, no. 6, pp. 744-747, June 1969.

[6] D. Zhang, Z. Guo, G. Lu, L. Zhang, and W. Zuo, "An online system of multispectral palmprint verification," Instrumentation and Measurement, IEEE Transactions on, vol. 59, no. 2, pp. 480-490, 2010.

[7] G. Giakos, "Multifusion, multispectral, optical polarimetric imaging sensing principles," Instrumentation and Measurement, IEEE Transactions on, vol. 55, no. 5, pp. 1628-1633, 2006.

[8] M. McGuire, W. Matusik, H. Pfister, B. Chen, J. Hughes, and S. Nayar, "Optical splitting trees for high-precision monocular imaging," IEEE Comput. Graph. vol. 27, no. 2, pp. 32-42, 2007.

[9] Tetracam Inc., "ADC," http://www.tetracam.com/Products-ADC.htm, 2011, accessed: Sep. 4, 2013. [Online]. Available: http://www.tetracam.com/Products-ADC.htm

[10] B. Wilburn, N. Joshi, V. Vaish, E. Talvala, E. Antunez, A. Barth, A. Adams, M. Horowitz, and M. Levoy, "High performance imaging using large camera arrays," ACM Trans. Graph., vol. 24, no. 3, pp. 765-776, July 2005.

[11] D. Yi, L. Kong, F. Wang, F. Liu, S. Sprigle, and A. Adibi, "Instrument an off-shelf ccd imaging sensor into a handheld multispectral video camera," Phot. Tech. Letters, IEEE, vol. 23, no. 10, pp. 606-608, 2011.

[12] Y. Gong, D. Zhang, P. Shi, and J. Yan, "High-speed multispectral iris capture system design," Instrumentation and Measurement, IEEE Transactions on, vol. 61, no. 7, pp. 1966-1978, 2012.

[13] A. Manakov, J. Restrepo, O. Klehm, R. Hegedüs, H. Eisemann, E. and Seidel, and I. Ihrke, "A reconfigurable camera add-on for high dynamic range, multi-spectral, polarization, and light-field imaging," ACM Trans. Graph., vol. 32, no. 4, pp. 47:1-47:14, July 2013.

[14] G. D. Sharp, Polarization modulation wheel, U.S. Pat. No. 8,408,708 B2, 2010.

[15] K. Oka, and T. Kaneko, "Compact complete imaging polarimeter using birefringent wedge prisms," Optics Express, vol. 11, no. 13, pp. 1510-1519, 2003.

[16] M. Kudenov et al., "Spectrally broadband channeled imaging polarimeter using polarization gratings," SPIE Optical Engineering+ Applications, International Society for Optics and Photonics, 2011.

[17] T. Knight, Y. Ng, C. Pitts, Light Field Data Acquisition Devices, and Methods of Using and Manufacturing Same, U.S. Pat. No. 8,289,440.

[18] T. G. Georgiev, Plenoptic camera, U.S. Pat. No. 7,620,309 B2, 2009.

[19] S. Mann and R. W. Picard, Being 'Undigital' with Digital Cameras: Extending Dynamic Range by Combining Differently Exposed Pictures. In Proc. IS&T, 442-448, 2005.

[20] S. K. Nayarand T. Mitsunaga, High Dynamic Range Imaging: Spatially Varying Pixel Exposures. In Proc. CVPR, vol. 1, 472-479, 2000.

[21] M. D. Tocci, C. Kiser, N. Tocciand P. A. Sen, A Versatile HDR Video Production System. ACM TOG 30, 4, 2011.

The invention claimed is:

1. A system for capturing a multiview, multispectral image of a subject utilizing an integral sensor and a single imaging lens, comprising:
a field multiplying element housing a plurality of reflective surfaces for obtaining multiple point-of-view (POV) images of a subject and directing each POV image along one of a plurality of different beam paths, the field multiplying element configured to pass an unreflected, centrally positioned zenith view through its center;
a filter housing element configured to receive a plurality of independent filters, each filter configured to receive one POV image along one of the plurality of different beam paths;
wherein the multiple POV images obtained through the field multiplying element and passing through the plurality of independent filters are directed through the single imaging lens and focussed on different areas of the integral sensor surrounding the centrally positioned zenith view for capturing the multiple POV images and the centrally positioned zenith view simultaneously in an image file.

2. The system of claim 1, wherein the plurality of reflective surfaces of the field multiplying element are arranged in a ring around the center of the field multiplying element.

3. The system of claim 2, wherein the plurality of reflective surfaces are substantially equal in size and arranged circularly around an inner surface of the ring around the center of the field multiplying element.

4. The system of claim 3, wherein the plurality of reflective surfaces are substantially flat.

5. The system of claim 1, wherein the filter housing element is configured to receive the plurality of independent filters in an array, each filter of the array configured to receive one POV image along one of the plurality of different beam paths.

6. The system of claim 5, wherein the filter housing element includes one or more polarizing filters for concurrent imaging of multiple light polarizations.

7. The system of claim 5, wherein the filter housing element includes one or more spectral bandpass filters and/or neutral density filters for concurrent imaging of a high dynamic range of light intensities.

8. The system of claim 1, further comprising a lens housing element configured to receive a plurality of field lenses, each field lens configured to align with one of the plurality of different beam paths of the field multiplying element and one of the plurality of independent filters in the filter housing element.

9. The system of claim 8, wherein the plurality of field lenses in the lens housing element are configured to perform light-field imaging for capturing information pertaining to light intensity going through each point in space at different directions.

10. The system of claim 8, wherein the plurality of field lenses in the lens housing element are configured to be directed and focussed independently, thereby allowing all multiview, multispectral images of the subject to be captured simultaneously.

\* \* \* \* \*